March 13, 1962
J. T. KINNEY
3,025,387
WELD ROD GUIDE
Filed Aug. 24, 1959
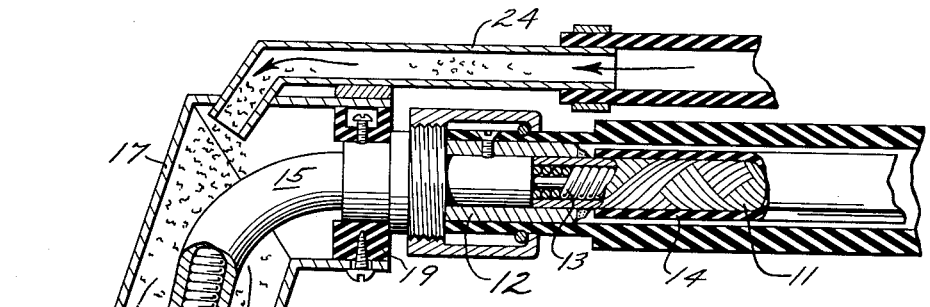
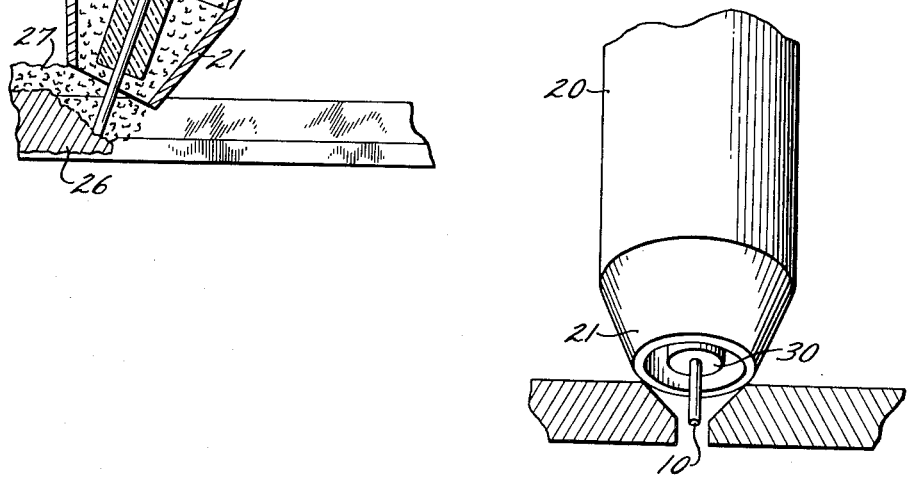
INVENTOR.
JOHN T. KINNEY
BY
Fryer and Johnson
ATTORNEYS

United States Patent Office 3,025,387
Patented Mar. 13, 1962

3,025,387
WELD ROD GUIDE
John T. Kinney, Peoria, Ill., assignor to Caterpillar Tractor Co., Peoria, Ill., a corporation of California
Filed Aug. 24, 1959, Ser. No. 835,797
4 Claims. (Cl. 219—130)

This invention relates to the guiding of welding rods and particularly to means for preventing weld wire or rod from bending due to excessive heat to which it is subjected during a welding process.

In a well known process for making heavy deposition rate welds, the rate of deposition is increased by the electrical resistance produced in that portion of the weld wire which extends beyond an electrical contact through which it is fed. When an arc is struck with the end, the resistance in this terminal portion of the wire, which may be several inches long, effects heating of the wire almost to its melting temperature and, therefore, softening of the wire to the point that it is difficult to guide it in a steady course to effect proper deposition of the weld material.

It is the object of the present invention to provide means adaptable to a standard type of welding gun capable of guiding the terminal portion of a hot weld wire throughout a greater part of its length between an electrical contact through which it passes and the end of the wire. It is also an object of the invention to provide such means in combination with a cone-type flux depositing mechanism which retains the wire in a coaxial or central position with respect to the outlet of the depositing mechanism thereby enabling the mechanism to be employed as a guide in following a gap in which weld material is being deposited together with a protective flux.

Further and more specific objects and advantages of the invention and the manner in which it is carried into practice are made apparent in the following specification wherein reference is made to the accompanying drawing.

In the drawing:

FIG. 1 is a central vertical longitudinal section through a conventional type weld gun with a weld rod guide embodying the present invention; and FIG. 2 is a fragmentary view in front elevation of a portion of the gun illustrating the manner of guiding the weld rod with respect to a gap between two parts of a weldment.

In FIG. 1 of the drawing, a weld rod or wire 10 is shown as threaded through a conducting cable 11 which is made up of a copper tube 12 and a coiled element 13 usually made of steel through which the weld rod may slide. The cable is suitably insulated as indicated at 14 and connected by conventional adapters to a gooseneck 15 of the same general construction as the conducting cable so far as the tube and coiled element are concerned, and this is connected with an electrical contact member 16 through which the weld wire extends. The gooseneck 15 is enclosed in a housing 17 within which it is secured by insulating spacers as indicated at 18 and 19. A cylindrical member 20 is telescopically fitted over the open end of the housing 17 and has a frusto-conical end portion 21 through which the weld rod extends. The cylindrical member 20 is adjustably positioned on the housing 17 and held in any desired position by set screws, one of which is shown at 22, so that it may be adapted to various lengths of weld rod which protrude beyond the end of the electrical contact 16 to vary the resistance provided by the extending portion of the rod.

The weld rod is automatically advanced through the gun by conventional mechanism, not shown, and granular flux is fed as by pressure into the housing 17 by means of a tube 24 so that it passes downwardly through the housing through ports 25 formed in the spacer 18 and is free to flow through the end of the gun insuring that the weld material is deposited as illustrated at 26 under a coating of the granular flux material as shown at 27 in FIG. 1 to effect what is referred to as submerged arc welding.

To the extent so far described, the welding gun is conventional with the exception of the adjustable cone-like end thereof. It has been found, with guns of this type, that the length of the weld rod protruding beyond the electrical contact member 16 is limited and, therefore, the rate at which the weld may be deposited is limited. This results from the fact that a longer extending end of the rod creates greater resistance and greater heat which increases the rate of deposit, but the greater heat also creates softness or flexibility beyond the practical limit which enables the rod to be satisfactorily guided for the purpose of making a neat, continuous deposit which is particularly desirable in single pass welding.

According to the present invention, a tube or guide of dielectric heat resistant material is connected to the electrical contact member 16 and extended throughout the major portion of the protruding weld rod thus supporting it and enabling it to be longer, hotter and more flexible but still capable of being properly guided during the deposit of the weld. The guide member shown at 30 may be made of aluminum oxide or other high melting point ceramic such as stabilized zirconia or high temperature porcelain and has a bore just slightly larger, that is about .005 inch, than the diameter of the electrode, to enable the electrode or welding rod to slide through it freely while still stabilizing it throughout the major portion of its length even though it is extremely hot and very close to its melting temperature. The member 30 has an enlarged bore at its upper end to fit over a reduced end of the electrical contact member 16 and may be secured thereon by a heat resistant adhesive material. Epoxy resin has been found suitable for this purpose.

Due to the greater heat which is made possible by guiding of the weld rod in accordance with the present invention, it has been found that the rate of weld wire deposition can be increased at least 100% over that of previous methods. A further advantage of the guide member 30 is that it insures holding of the weld rod in a position concentric with the outlet of the conical end 21 of the housing and therefore, in some instances, as where deposit is being made in a V-type gap as shown in FIG. 2, the end of the gun may be permitted to contact the edges of the gap and be guided thereby to effect perfect centering of the weld rod 10 with respect to the gap.

I claim:

1. The combination with a welding gun having guide means through which a weld wire is fed and electrical contact means engageable with the wire at a point remote from its end to create resistance and effect heating of the wire when an arc is struck with its end to a temperature which greatly reduces the rigidity of the wire, of a guide extending from the contact means to a point adjacent the end of the wire to prevent flexing of the wire due to its softening caused by heat, said guide being a tube of dielectric heat resistant material secured against movement with respect to the contact means.

2. The combination with a welding gun having guide means through which a weld wire is fed and electrical contact means engageable with the wire at a point remote from its end to create resistance and effect heating of the wire when an arc is struck with its end to a temperature which greatly reduces the rigidity of the wire, of a guide extending from the contact means to a point adjacent the end of the wire to prevent flexing of the wire due to its softening caused by heat, said guide being a tube of dielectric heat resistant material secured against movement with respect to the contact means and having an inside diameter just slightly larger than the size of the wire to permit free sliding of the wire therethrough while preventing distortion thereof.

3. The combination with a welding gun having guide means through which a weld wire is fed and electrical contact means engageable with the wire at a point remote from its end to create resistance and effect heating of the wire when an arc is struck with its end to a temperature which greatly reduces the rigidity of the wire, of a dielectric heat resistant guide extending from the contact means to a point adjacent the end of the wire to prevent flexing of the wire due to its softening caused by heat, a housing surrounding the contact means and guide, and an extensible tubular end on said housing rigidly supported in substantially concentric relationship with the guide.

4. The combination with a welding gun having guide means through which a weld wire is fed and electrical contact means engageable with the wire at a point remote from its end to create resistance and effect heating of the wire when an arc is struck with its end to a temperature which greatly reduces the rigidity of the wire, of a dielectric heat resistant guide extending from the contact means to a point adjacent the end of the wire to prevent flexing of the wire due to its softening caused by heat, a housing surrounding the contact means and guide, and an extensible tubular end on said housing rigidly supported in substantially concentric relationship with the guide, said housing having a frusto-conical open end adapted to engage the edges of a gap in which a weld is to be deposited to facilitate uniform deposition of the weld material.

References Cited in the file of this patent

UNITED STATES PATENTS

| | | |
|---|---|---|
| 1,552,369 | White | Sept. 1, 1925 |
| 2,590,084 | Bernard | Mar. 25, 1952 |
| 2,736,787 | Welch | Feb. 28, 1956 |
| 2,827,550 | Unrath | Mar. 18, 1958 |
| 2,965,746 | Cresswell | Dec. 20, 1960 |